United States Patent [19]

Cain et al.

[11] 4,371,299

[45] Feb. 1, 1983

[54] TRAILER FRAME

[75] Inventors: Darryl F. Cain, East Moline, Ill.; Kevin L. Ehrecke, Blue Grass, Iowa

[73] Assignee: Deere & Company, Moline, Ill.

[21] Appl. No.: 171,858

[22] Filed: Jul. 24, 1980

[51] Int. Cl.$^3$ ............................ B60P 3/00; B60P 7/08; B61D 3/16; B61D 45/00

[52] U.S. Cl. ........................................ 410/44; 56/228; 248/670; 296/3; 410/77; 414/534

[58] Field of Search ............ 280/63, 414 R; 248/172, 248/173, 670; 296/3, 4, 5, 6, 7, 8, 9; 410/2, 34, 44, 45, 53, 54, 55, 77; 414/679, 537, 533, 534; 56/226, 228

[56] References Cited

U.S. PATENT DOCUMENTS

| | | | |
|---|---|---|---|
| 328,793 | 10/1885 | Leonhardt | 414/537 X |
| 1,017,160 | 2/1912 | Merritt | 410/2 X |
| 2,733,823 | 2/1956 | Evans | 414/534 X |
| 2,903,274 | 9/1959 | Leonard, Jr. | 410/45 |
| 3,058,756 | 10/1962 | Holsclaw | 414/534 X |
| 3,122,245 | 2/1964 | Mackusick et al. | 414/534 X |
| 3,155,249 | 11/1964 | Johnson | 414/534 |
| 3,245,695 | 4/1966 | Bernard | 56/228 |
| 3,413,014 | 11/1968 | Franz | 280/400 |
| 3,608,753 | 9/1971 | Scott | 296/3 X |
| 3,655,218 | 4/1972 | Taylor | 410/44 |
| 4,184,694 | 1/1980 | Porter | 410/2 X |

OTHER PUBLICATIONS

Jantz, Twin Header Trailer, Sales Catalog, 2 pages, Jantz Manufacturing, Inc., Box 260, Moundridge, Kan., 67107.

Primary Examiner—Robert B. Reeves
Assistant Examiner—Howard Beltran

[57] ABSTRACT

A transporter or trailer for endwise transport of combine headers and the like, consists of a standard four-wheel wagon running gear carrying an elongated generally rectangular frame providing support surfaces compatible with a variety of sizes and types of header. A pair of longitudinally spaced fixed pockets at the left-hand side of the adapter frame receives heel portions adjacent the rear of headers of the corn head or row-crop head type while a somewhat elevated, swingably adjusted, rail may be set to an appropriate contact and support forward portions of a particular header. In alternative embodiments, an auxiliary laterally adjustable rail may support a second front portion of a header, or additional support "cradles" may be attached along the left-hand side of the frame to accommodate headers with elongated transverse beam members such as grain platforms.

16 Claims, 8 Drawing Figures

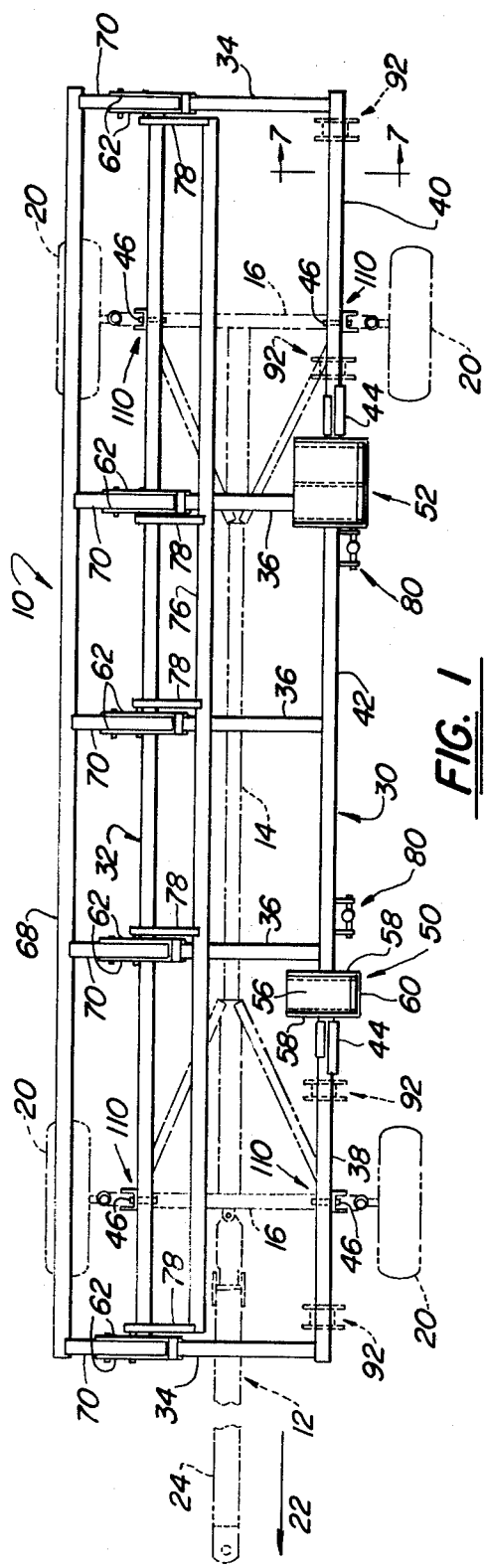
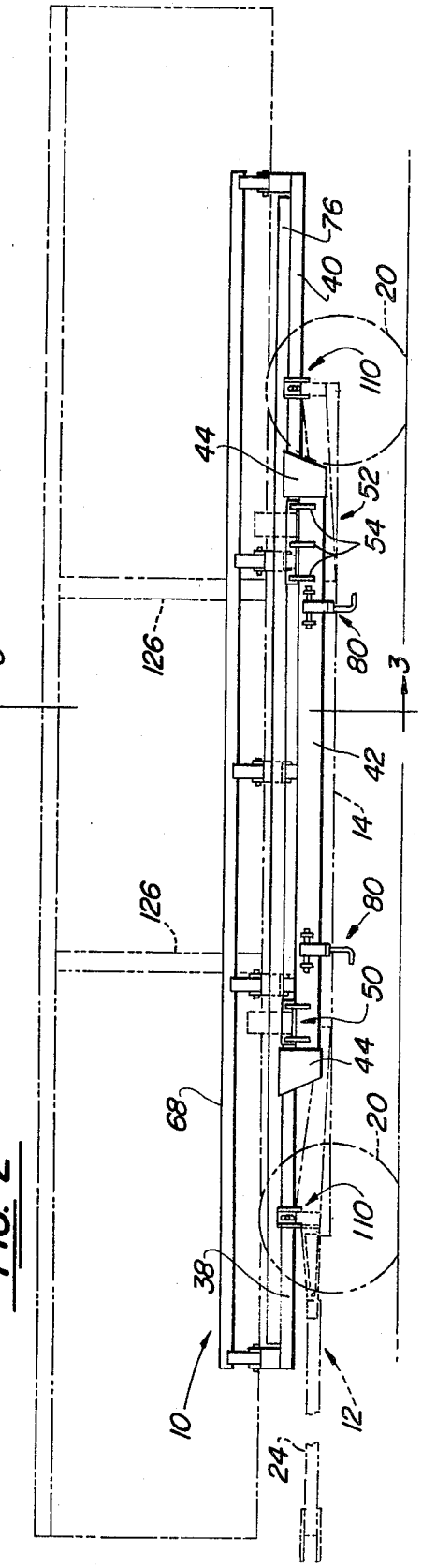
FIG. 1
FIG. 2

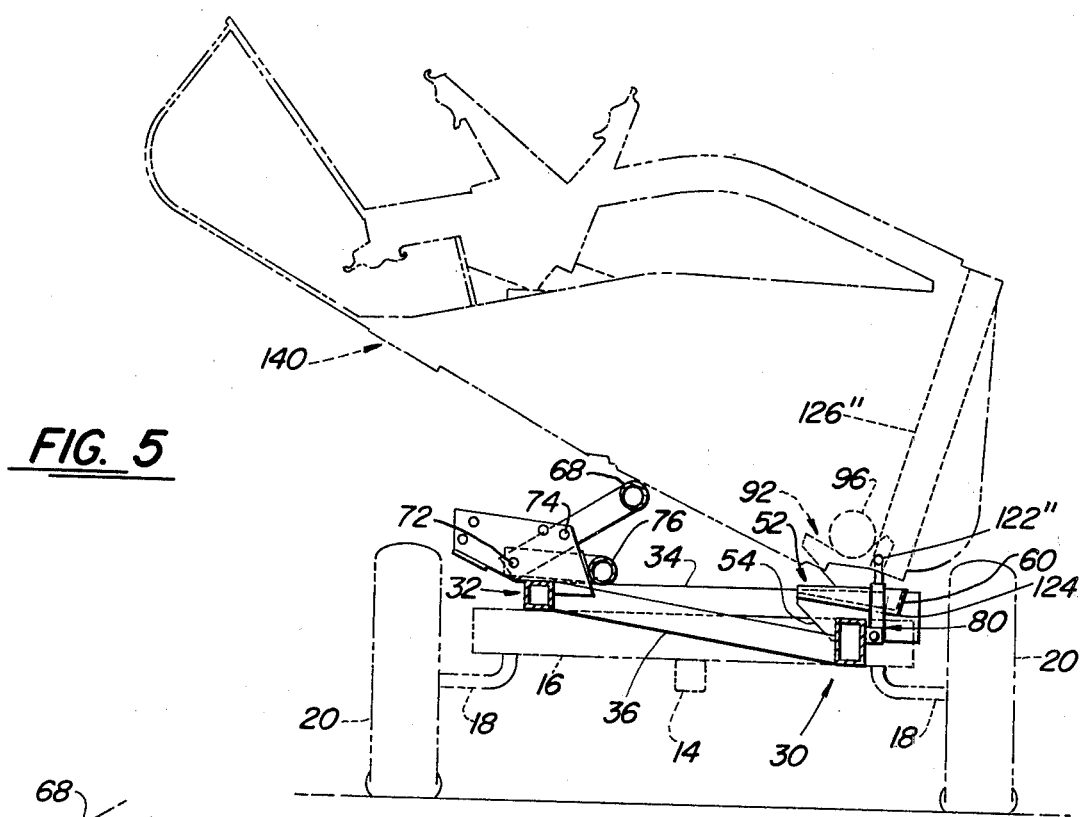
FIG. 5
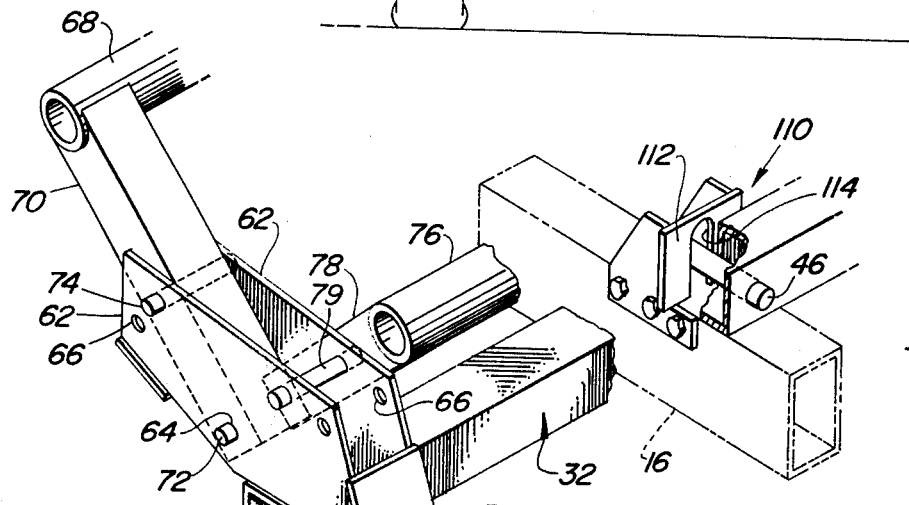
FIG. 6
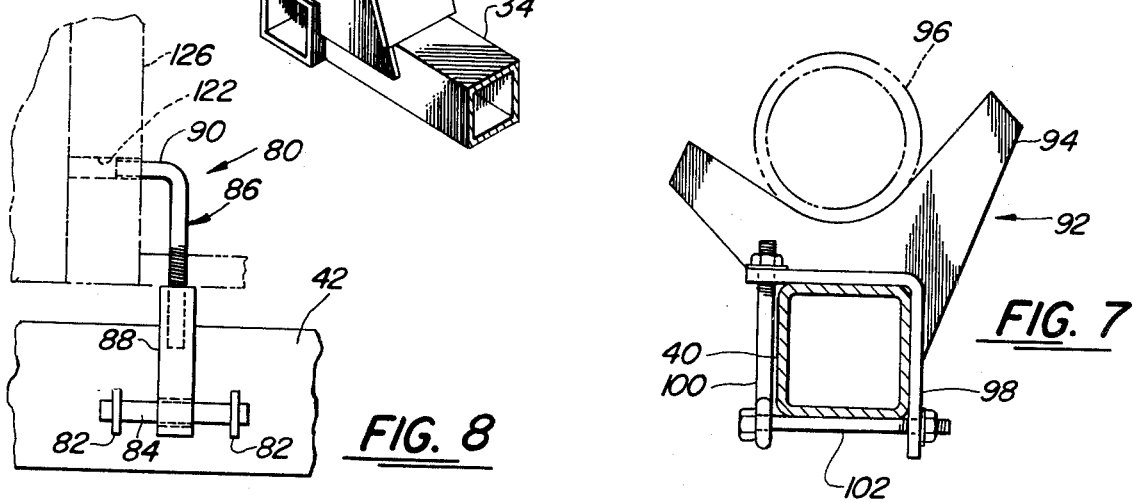
FIG. 8
FIG. 7

TRAILER FRAME

BACKGROUND OF THE INVENTION

The invention relates to means for transporting headers of combines or other harvesting machines and, more particularly, to provision of towable vehicle for endwise transport of headers and the like.

The size of harvesters continues to increase and already there are header sizes in common use too wide to be transported conveniently when carried in their normal operating position on the combine or other harvesting machine. However, the overall length, from front to rear of fully assembled headers, generally still offers an acceptable transport width if the header is transported endwise.

It is known to provide special purpose trailers for particular types of headers but such special or single purpose devices tend to be economically unattractive. General purpose implement trailers are also expensive and not always conveniently adaptable to header transport and especially handling of the wider platforms (30 feet and more) now coming into use.

Adoption of wider platforms has intensified the need for transport means other than the harvester itself, but of course transport of all sizes of headers independently of the harvester is often desirable. Logistically the need may arise because, as is common, an operator has two or more types of header available for his basic machine and sometimes these need to be moved as a harvesting unit, from farm to farm for example, or a header may need to be moved to a repair shop.

SUMMARY OF THE INVENTION

Accordingly, an object of the invention is to provide a low cost means for endwise transport of combine headers and the like, simple and convenient to use and adaptable to a variety of sizes and types of header.

According to the invention, a towable trailer or transporter for a header is provided by combining a towable running gear or undercarriage with a releasable and removable frame supported by the running gear and adaptable to a variety of headers.

The running gear may be a standard wagon running gear and the frame may be simply supported and retained on it and easily removable so that the running gear is readily available for other purposes and the header transport means may thus be provided at only the cost of a special frame. The latter may be a relatively light and simple structure in that its function is to adapt the running gear chassis to supporting a header rather than having itself to provide the total support for the header. Preferably, a four wheel running gear is used with the adapting frame contacting and being supported at each of front and rear running gear bolsters by a pair of spaced-apart support points. Preferably at each support point, provision is made for substantially vertical but limited relative movement between the adapter frame and the running gear bolster to accommodate relative deflection between frame and running gear in traveling over uneven ground. This provision for relative deflection contributes to efficient structural design in that it limits stresses induced in the frame and running gear structures during operation.

The adapter frame may have a simple, generally rectangular configuration, substantially spanning the running gear bolsters and having sets of left and right hand spaced-apart support surfaces for engaging and supporting a header. A plurality of longitudinally aligned surfaces, spaced apart but having a fixed lateral disposition, may be provided towards one side of the frame. In keeping with the invention, support surfaces towards the other side of the frame may be laterally adjustable to accommodate several types and sizes of header. Preferably, the laterally fixed support surfaces of the adapter frame will be designed to engage and provide support for principal structural members towards the rear of the header. A pair of spaced-apart pockets may for example, receive a somewhat downwardly extending frame portion adjacent upright structural members flanking the rearward discharge opening of a row crop harvesting header or corn head. Alternatively, the laterally fixed supports may engage an elongated frame member, typical of a header of the grain or cutting platform type. Adaptability may be extended by providing for particular headers optional fixed or single position support members, readily attachable to the frame in any one of a range of positions.

The adjustable or movable support may provide support surfaces longitudinally aligned (in terms of travel direction of the transporter) and substantially spanning the width of the widest header to be accommodated. The supports may be provided by a continuous rail carried on radius or pivot arms, pivoted at fixed points on the adapter frame with means provided to hold the rail in any one of a range of positions. The shiftable support may then be selectively located to engage a generally forward portion of the header structure such as ground engaging undersurface points, for example skid plates on a row crop header or the underside of a cutting platform floor.

The movable support may include two independently adjustable portions so as to provide a pair of parallel sets of support surfaces comparatively closely spaced so that the total support for a header may comprise a fixed support towards its rear and a pair of adjustable supports towards its front. This form is particularly useful for providing stable support of headers in which forward row unit portions are pivotally attached to a main header structure for floating to accommodate uneven ground.

Preferably, the movable support is, in any of its range of positions, somewhat elevated with respect to the other support, allowing a forward portion of the header to extend laterally outwards from one side of the frame and running gear while the rear portion of the header is disposed relatively close to the other side of the running gear. In this way, the center of gravity of the header falls well within the lateral space between the support points of the adapter frame so that the header is stably supported, minimizing the requirement for security means for holding the header in position on the frame. If desired, transport width may be reduced, or access for repair or adjustment improved, by disconnecting the float limiting linkages of the gatherer points of, for example, a corn head or a row crop head, and allowing them to hand downwards at the side of the transporter.

An advantage of a header transporter according to the invention, is that a header may be placed directly on the transport making use of the header height control system of the harvester. After maneuvering into position, the header may be lowered to contact the support surfaces of the adapter frame and a typical connection between header and harvester (feeder house) is such that the feeder house will fall away from the header leaving it in position on the transport frame. An advantage of an elevated disposition of the header front supports is that the attitude of the header as supported by the transporter may approximate its attitude while still supported by the harvester but at the point of transfer of support, thus facilitating transfer and retraction or uncoupling of the harvester, typically involving the moving downwards and rearwards of a feeder house.

BRIEF DESCRIPTION OF THE DRAWINGS

FIG. 1 is an overhead view of a combination embodying the invention, including an adapter frame for supporting a combine header with a wagon running gear supporting the frame shown in phantom outline.

FIG. 2 is a left side elevation of the combination with a harvesting header, shown in phantom outline, supported on it.

FIGS. 3, 4 and 5 are similar views, taken approximately on line 3—3 of FIG. 2 showing, respectively, the adjustable portions of the adapter frame in three different settings and supporting three different types of header (shown in phantom outline only).

FIG. 6 is a left-hand, three quarter, somewhat overhead, enlarged partial, perspective view of the front end of the adjustable rails of the adapter frame along with one of the rail positioning brackets and also a detail of the means for securing the adapter frame to the bolster of the wagon running gear.

FIG. 7 is an enlarged partial cross-sectional view approximately on line 7—7 of FIG. 1 showing one of the removable cutting platform support cradles in position on the adapter frame.

FIG. 8 is an enlarged partial view of one of the turnbuckle assemblies of the adapter frame engaging one of the frame members of a header for securing the header to the adapter frame.

DESCRIPTION OF THE PREFERRED EMBODIMENT

Figure 3:
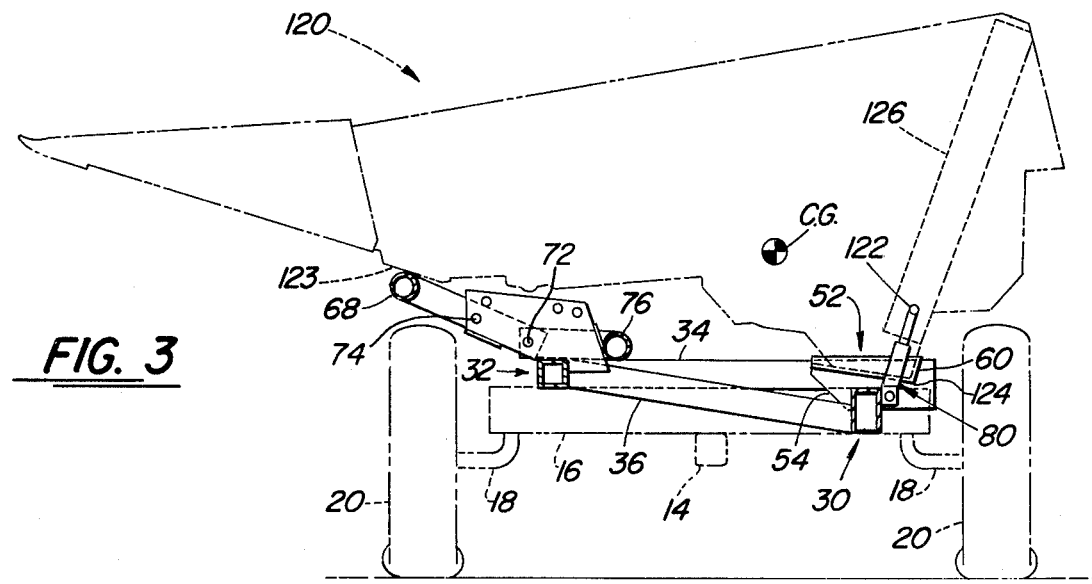

FIGS. 1 and 2 are general views of an arrangement embodying the invention. A header supporting adapter frame 10 is supported on a conventional wagon running gear 12, shown only in schematic outline and including the usual longitudinal member or spine 14, a pair of transverse axle assemblies including front and rear bolster members 16, the whole supported above the ground by axles 18 and wheels 20 and towable, in the direction of travel indicated by the arrow 22, by a suitable vehicle through the forward extending tongue 24. Preferably, the front axle is steerable responsive to pivoting of the tongue 24 but this is not shown.

Designations of front and rear, left and right, are made with reference to the forward direction of travel, with the observer facing in that direction.

The adapter frame 10 is generally rectangular in form and is long enough to extend beyond the running gear bolsters 16 front and rear. Its main structure includes a fore-and-aft extending left hand beam assembly 30, a parallel right hand beam 32 and, extending between them and rigidly attached at their opposite ends, a series of cross members comprising horizontal tubular members 34 at front and rear and three intermediate approximately equally spaced inclined tubular members 36. To provide the desired configuration as well as requisite strength, the left-hand member 30 is a composite assembly consisting of front and rear square tube portions 38 and 40, respectively and, spanning between their lower sides, a rectangular tube 42. Gussets 44 reinforce the connection of the rectangular tube 42 to the square tubes 38 and 40. Fixed retaining pins 46 extend horizontally outwards in pairs from the longitudinal members 30 and 32 of the frame at pairs of opposite points between the adjacent cross ties 34 and 36 at both the front and rear of the frame (front right-hand members shown in some detail in FIG. 6).

Front and rear support pockets 50 and 52 respectively, are supported by and closely above the rectangular tube portion 42 by gussets 54. The general construction of the pockets 50, 52 is similar, the front pocket 50, for example, including an outwardly sloping floor 56 and upright flanges or side walls, 58 at front and rear and outer 60. However, the front pocket 50 is narrower (has lesser fore-and-aft extent) than the rear pocket 52.

At each junction between a cross member 34, 36 and the right-hand beam or longitudinal member 32, a pair of spaced parallel pivot and positioning bracket plates 62 is rigidly attached to the frame, somewhat above it and extending partially outwards from the frame, as seen best in FIG. 6. A pivot hole 64 and a series of positioning or retaining holes 66 in each plate 62 are paired in fore-and-aft alignment. An outer support rail 68 extending the full length of the frame 10 is carried on a series of radius arms 70, the arms being co-axially pivotally mounted, one between each pair of positioning plates 62 supported by a pivot pin 72 carried in the pivot holes 64. The position of the outer rail 68 is determined and fixed by inserting a positioning pin 74 in the desired position through one of the positioning holes 66 in the plates 62 and through the radius arm 70 as required.

An inner rail 76 is similarly supported except that its radius arms 78 are positioned alongside one of the plates 62 variously forwardly and rearwardly as shown in FIG. 1. The inner rails 76 are pivoted through their arms about the long common pivot pin 72 which extends through the plates 62 and maintained in a selected position by positioning pins 79 extending through the plates 62 and into the radius arm 78.

A pair of turnbuckle hold-down devices 80 provide vertical restraint or hold-down of header relative to adapter frame. As seen best in FIG. 8, each turnbuckle assembly 80 is pivotally attached to the left-hand frame member 30 (rectangular tube 42) by a pair of spaced lugs 82 and a pivot pin 84. An L-shaped threaded member 86 is adjustably threaded into a barrel 88, its horizontal extremity 90 being engageable in a suitable hole of the header being transported.

To support certain types of headers, alternate support means, such as the cradle assembly 92 shown in FIG. 7, may be assembled to the frame. Such cradle assemblies may be located, for example, as indicated in FIG. 1, carried in pairs on the front and rear square longitudinal tubes 38 and 40 respectively. Each assembly includes one or more cradle members 94 shaped to receive a suitable support surface of a header being transported such as may be offered by the transverse tubular beam 96 of a cutting platform indicated in phantom outline in FIGS. 5 and 7. Each cradle assembly 92 may include a saddle member 98 and a pair of interlocking clamping bolts 100, 102 for securing it to the frame.

For operation, the adapter frame 10 is preferably supported by a conventional running gear such as that shown (12) in the drawings, although any wheeled and towable frame or chassis having a structure able to receive the adapter frame 10 may be used. The frame 10 is positioned on the running gear bolsters 16 with the longitudinal frame members 30, 32 approximately symmetrically placed with respect to a fore-and-aft center line of the running gear. The frame 10 is retained on the bolsters 16 by four retainer bracket assemblies 110, each bolted to a bolster 16 and including a vertically and fore-and-aft disposed plate 112 having a vertical slot 114 engaging one of the pins 46 extending outwards from the longitudinal members 30, 32 of the frame. It is arranged that the retainer bracket plates 112 bear sufficiently closely against the frame members so as to maintain the lateral position of the adapter frame 10 on the bolsters while the pins 46 extend through the slots 114 approximately midway along their length (FIG. 6).

In preparation for placing a header on the transporter, the rails 68, 76 are positioned as required for the particular header. For example, for a typical corn head 120, the outer rail 68 is placed in a lower outer position and the inner rail 76 is placed in an inactive position resting against the frame as indicated in FIG. 3. A combine carrying the corn head 120 may then be maneuvered so that, using the combine header height control system, it may be lowered into position into the frame 10 and supported (with reference to the corn head) forwardly by contact between the rail 68 and ground-engaging skid plates or shoes 123 of the corn head and rearwardly by rigid heel-like portions 124 of the corn head frame adjacent upright frame members 126 contacting the floor portions, such as 56, of the support pockets 50 and 52. One of the support pockets, such as the forward pocket 50, may be dimensioned to quite positively locate the fore-and-aft position of the corn head 120 relative to the frame 10 by arranging that the walls 58, front and rear, closely limit fore-and-aft movement of the heel portion 124 of corn head. To accommodate corn heads of various dimensions and to facilitate positioning of the corn head and proper register with the frame, the other support pocket (52) may be more generously dimensioned fore-and-aft. In many combines, the operator station is offset to the left of the fore-and-aft center line of the combine, so that an operator is well placed to "sight" the forward ("left hand") pocket 50 and maneuver the header heel 124 into engagement with it.

The corn head is maintained in a given lateral disposition relative to the frame by the heel portion 124 being engagable with the outer flanges (60) of the pockets 50 and 52 and by virtue of the inclination of the pocket floor portions (56) and the somewhat elevated disposition of the support rail 68. To hold the corn head down against the frame 10 and particularly against the pockets 50 and 52, turnbuckle assemblies 80 are suitably adjusted so that their horizontal screw portions 90 may engage holes 122 in the corn head uprights 126.

Figure 4:
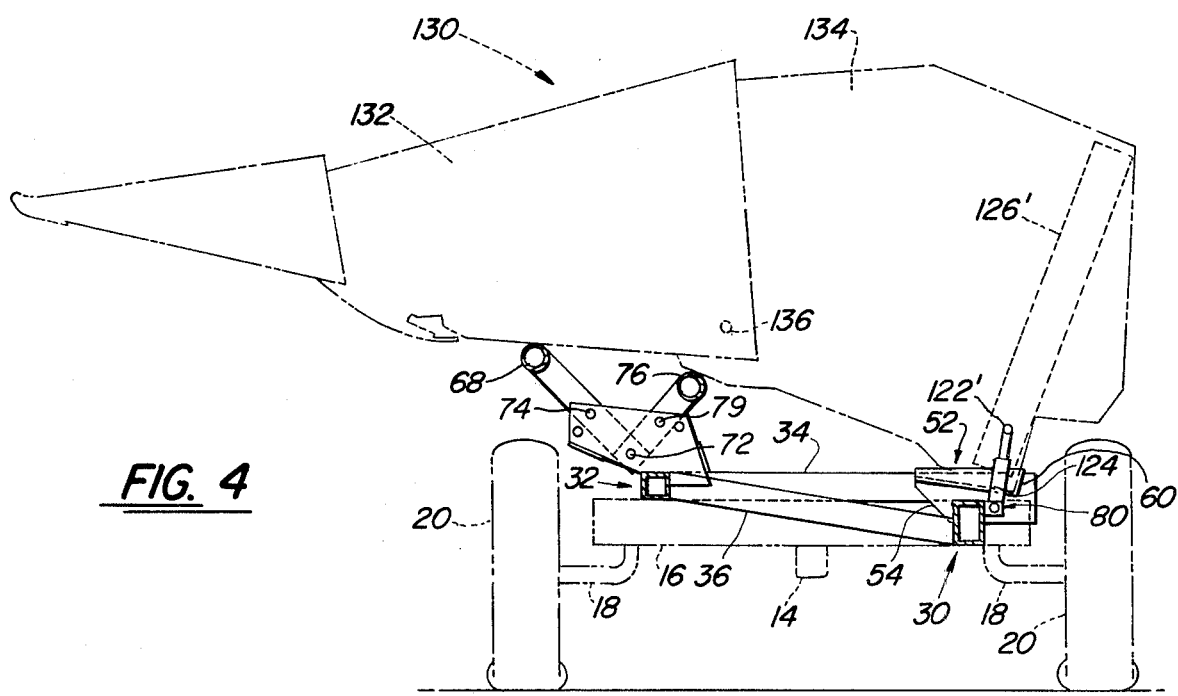

In FIG. 4 a row crop head 130 (for harvesting particular row crops such as soybeans) is shown in phantom in transport position on the transporter. The so-called row crop head is an example of a header in which a plurality of forward ground-engaging row unit portions 132 may float vertically relative to a base unit 134 (typically including a cross conveyor arrangement) about a transverse pivot 136. The inner or auxiliary support rail 76 (which may be made optional) may advantageously be used in conjunction with the outer rail 68 and positioned somewhat as indicated in FIG. 4 to provide spaced-apart support for a generally forward portion of the header so that during transport and particularly over rough surfaces, the header is supported so as to prevent undesirable oscillation of the row unit portions 132 relative to the base unit 134. The rearward portion of the row crop head 130 is supported and held down in a similar manner to the corn head 120 as described above.

Another form of header, such as the grain or cutting platform 140 exemplified in phantom outline in FIG. 5, may lend itself to the use of optional removable support surface assemblies, such as the cradle assemblies 92. As indicated in FIG. 5, such platforms are stably supported with the nominally "outer" rail 68, positioned as shown, and the inner rail 76 in an inactive position resting against the cross members 34 and a transverse beam 96 of the header 140 cradled in the cradle assemblies 92. Again a similar hold-down means 80 is employed but there is no contact between the rearward portion of the header 140 and the support pockets 50 and 52.

Basically, setting or adjusting the adapter frame 10 to receive and support a particular header is a simple matter of positioning the swingable rail or rails (68, 76) and inserting the retaining pins (74, 79). The continuous rail then offers economically an uninterrupted support surface, spanning the header and avoiding the need for precise positioning of the forward portions of the header.

As indicated in FIGS. 3, 4 and 5, the adapter frame 10 supports each of the various headers in a similar attitude. In particular, the uprights 126, 126', 126" of the respective headers are similarly inclined. These uprights with transverse holes 122, 122' 122" represent the unmodified coupling members of the header which mate with the coupling members of the conventional combine feeder house which is used, without change, for all headers. The transporter combination is designed so that the inclination of the uprights 126, 126' 126" is such as to facilitate coupling and uncoupling between header and feeder house as the header is placed on and removed from the transporter. In particular, it is arranged that as the header is lowered onto the frame, the forward support point of the header is contacted first.

The adapter frame 10, a simple and inexpensive structure, made mobile by combining it with a simple, standard, running gear 12 and adaptable to a variety of headers 120, 130, 140, without modification of the header, presents an attractive solution to the problem of transport of headers independent of their harvesting machine base.

We claim:

1. A towable transporter for endwise transport of a laterally elongated harvesting header having at least two rearward downwardly facing spaced-apart support surfaces comprising:
    a towable undercarriage having at least two wheels for supporting the undercarriage above the ground and including spaced-apart front and rear generally laterally and horizontally extending bolsters;
    an elongated longitudinally extending frame spanning the bolsters and supported by them and having opposite first and second lateral sides extending generally longitudinally of the undercarriage;
    first header support means, having first localized fixed support surfaces carried by the frame adjacent the first lateral side;
    an elongated longitudinally extending movable header support member providing longitudinally extending and aligned support surfaces and fixed pivot means for connecting the member to the frame adjacent the second lateral side so that the support surfaces are shiftable in a range of laterally spaced positions, said range overlying the pivot means and each position providing, in cooperation with the first support means, a particular combination of support surfaces for receiving and stably supporting a particular header; and means for positioning and retaining the frame on the bolsters.

2. The transporter of claim 1 wherein the movable support member includes an elongated rail providing at least some of the support surfaces and the pivot means for connecting the member to the frame includes a pivot having a fore-and-aft extending axis and the rail is spaced from the pivot so that it is swingable in an arc above the frame so as to provide the range of positions.

3. The transporter of claim 2 wherein the support surfaces of the first support means are provided at least in part by a pair of header support pockets each having an outwardly inclined floor and opposite longitudinally spaced-apart retaining side walls and further including means carried by the frame for retaining the rail selectively in each position of the range of positions.

4. The transporter of claim 3 wherein the movable support means further includes a second longitudinally extending rail independently retainable in a plurality of dispositions paralleling those of the first rail.

5. The transporter of claim 3 wherein, in each of its retained positions, the rail is elevated somewhat above the floor of the pocket.

6. The transporter of claim 3 wherein the rail is longitudinally co-extensive with the frame and comprises a structurally continuous member.

7. The transporter of claim 3 wherein the pockets engage two of the rearward downward facing support surfaces of the header and the rail engages forward portions of the header.

8. The transporter of claim 7 and further including adjustable coupling means pivotally connected to the frame for engaging the header adjacent the rearward support surfaces for securing it against upward motion relative to the frame.

9. The transporter of claim 1 wherein the frame normally engages each bolster at a pair of spaced-apart support points and wherein the means for retaining the frame on the bolsters includes means for permitting limited vertical movement of the frame relative to the bolster at each support point.

10. The transporter of claim 9 wherein the means for permitting limited relative movement includes at each support point, a bracket having an upright slot and a pin extending laterally from the frame and engaging the slot.

11. The transporter of claim 1 wherein the first header support means includes at least two longitudinally aligned detachable cradle assemblies for engaging an elongated header frame member extending transversely of the header and extending longitudinally when the header is supported by the transporter.

12. An adapter arrangement, for use in cooperation with a wagon running gear having spaced-apart front and rear bolsters, for supporting and transporting a harvesting header having spaced-apart front and rear undersurfaces comprising:

a main frame having laterally spaced and laterally interconnected first and second longitudinal members, for spanning and being supported by the bolsters;

means for releasably securing the main frame to the bolsters;

a plurality of fixed spaced support members for engaging the rear undersurfaces of the header, carried by the frame adjacent the first longitudinal member;

a sub-frame having support surfaces and fixed pivot means for connecting the sub-frame to the main frame so that the support surfaces are laterally displaceable so as to provide a plurality of positions of the support surfaces for engaging forward undersurfaces of a header; and means for retaining the sub-frame in a predetermined position relative to the main frame for selectively engaging a particular portion of the forward undersurfaces of a particular header.

13. The adapter arrangement of claim 12 wherein the pivot means for connecting the sub-frame to the main frame includes a pivot having a longitudinal axis and the sub-frame includes an elongated support member providing at least some of the support surfaces and spaced from the pivot axis by a plurality of radius arms and the sub-frame is disposed so that the support member is swingable through an arc above the main frame and overlying the pivot axis.

14. The adapter arrangement of claim 13 wherein the main frame includes a plurality of transversely oriented positioning plates closely spaced from the radius arms and the means for retaining the sub-frame in a predetermined position includes locking means for engaging each radius arm and positioning plate and fixing their relative positions.

15. The adapter arrangement of claim 12 wherein the means for securing the main frame to the bolsters includes means for permitting limited relative upward motion of the main frame relative to the bolster.

16. The adapter arrangement of claim 12 wherein the first longitudinal member includes front and rear portions and an intermediate portion connecting the front and rear portions and offset vertically below them and the fixed header support members are carried by the intermediate portion, said support members providing support surfaces offset below the support surface positions of the sub-frame.

* * * * *